United States Patent [19]
Holcman

[11] Patent Number: 6,115,607
[45] Date of Patent: Sep. 5, 2000

[54] METHOD AND APPARATUS FOR REDUCING MESSAGING TRAFFIC IN A WIRELESS COMMUNICATION SYSTEM

[75] Inventor: Alejandro R. Holcman, San Diego, Calif.

[73] Assignee: Qualcomm Incorporated, San Diego, Calif.

[21] Appl. No.: 09/016,580

[22] Filed: Jan. 30, 1998

[51] Int. Cl.[7] .................................................. H04Q 7/20
[52] U.S. Cl. .......................................... 455/435; 455/422
[58] Field of Search .............................. 455/435, 17, 422, 455/432, 517, 410

[56] References Cited

U.S. PATENT DOCUMENTS

| | | | |
|---|---|---|---|
| 4,112,257 | 9/1978 | Frost | 179/2 EB |
| 4,200,770 | 4/1980 | Hellman et al. | 178/22 |
| 4,475,010 | 10/1984 | Huensch et al. | 179/2 |
| 4,765,753 | 8/1988 | Schmidt | 379/60 |
| 4,775,999 | 10/1988 | Williams | 379/59 |
| 4,876,738 | 10/1989 | Selby | 455/33 |
| 4,977,399 | 12/1990 | Price et al. | 340/825.44 |
| 5,042,082 | 8/1991 | Dahlin | 455/33 |
| 5,043,736 | 8/1991 | Darnell et al. | 342/357 |
| 5,054,110 | 10/1991 | Comroe et al. | 455/33 |
| 5,097,499 | 3/1992 | Cosentino | 379/595 |
| 5,127,100 | 6/1992 | D'Amico et al. | 455/335 |
| 5,159,596 | 10/1992 | Itoh | 370/95 |
| 5,212,822 | 5/1993 | Fukumine et al. | 455/33 |
| 5,241,598 | 8/1993 | Raith | 380/21 |
| 5,289,527 | 2/1994 | Tiedemann, Jr. | 379/59 |
| 5,301,357 | 4/1994 | Thompson | 455/435 |
| 5,305,466 | 4/1994 | Taketsugu | 455/33 |
| 5,313,653 | 5/1994 | Sasuta | 455/17 |
| 5,396,496 | 3/1995 | Ito et al. | 370/50 |
| 5,509,052 | 4/1996 | Chia et al. | 455/435 |
| 5,519,706 | 5/1996 | Bantz et al. | 455/435 |
| 5,629,975 | 5/1997 | Tiedemann, Jr. et al. | 455/435 |
| 5,864,755 | 1/1999 | King et al. | 455/435 |
| 5,870,685 | 2/1999 | Flynn | 455/435 |

FOREIGN PATENT DOCUMENTS

| | | | |
|---|---|---|---|
| 0439628 | 8/1990 | European Pat. Off. | H04Q 7/04 |
| 0472349 | 2/1992 | European Pat. Off. | H04B 7/26 |
| 29713989 | 10/1997 | Germany | H04Q 7/38 |
| 2193861 | 8/1987 | United Kingdom | H04Q 7/04 |
| 2243976 | 2/1991 | United Kingdom | H04Q 7/04 |
| 9406219 | 3/1994 | WIPO | H04B 7/26 |

OTHER PUBLICATIONS

*Applied Cryptography—Protocols, Algorithms, and Source Code in C*, Second Edition, Bruce Schneier, "Key–Exchange Algorithms", Chapter 22, pp. 513–520.
"Applied Cryptography—Protocols, Algorithms, and Source Code in C", Second Edition, Bruce Schneier "Special Algorithms for Protocols", Chapter 23, pp. 546–548.
"A New Location Updating Method for Digital Cellular Systems", IEEE 1991, Sadaatsu Okasaka, Seizo Onoe, Syuji Yazuda and Aihiro Maebara, pp. 345–350.

*Primary Examiner*—Dwayne D. Bost
*Assistant Examiner*—Quochien B. Vuong
*Attorney, Agent, or Firm*—Philip R. Wadsworth; Thomas M. Thibault; Gregory D. Ogrod

[57] ABSTRACT

A method and apparatus for reducing messaging traffic, including air and network messaging, in a wireless communication system. The invention informs a mobile station of its subscription status, either active or inactive, within the communication system. If the mobile station subscription status is inactive, the mobile station is prevented from registering with the communication system. All other functions of the inactive mobile remain enabled, such as the ability to make emergency calls, to change the subscription status to active status, or to allow for base station maintenance control.

12 Claims, 3 Drawing Sheets

METHOD AND APPARATUS FOR REDUCING MESSAGING TRAFFIC IN A WIRELESS COMMUNICATION SYSTEM

BACKGROUND OF THE INVENTION

I. Field of the Invention

The present invention relates generally to wireless communication systems and more particularly relates to a method and apparatus for reducing messaging traffic by disabling the registration process in non-subscribed mobile telephones.

II. Description of the Related Art

In a cellular communication system, registration is the process a mobile station uses to notify a cellular communication system whether or not it is turned on and through which base station it is communicating. The mobile station may be of a cellular radiotelephone or personal communication device typically in the form of a vehicle mounted unit or a hand carried portable unit.

For calls directed to a mobile station, often called mobile terminated calls, the communication system must determine whether or not the mobile station is powered on and which base station the mobile station is receiving. To find the mobile station, the cellular system broadcasts a message, often called a page, from many base stations. If the mobile station responds, the cellular system continues handling the call with further communication being directed to the base station of the coverage area in which the mobile station is located. It should be further understood that the paging process is used to locate the mobile station for any other transactions to be done with the mobile station. The base station and its coverage area are commonly referred to as a cell.

If the system has no knowledge of the location of the mobile station, then the system must broadcast pages in every sector of every base station. As the amount of mobile terminated traffic increases, the communications resources to support system wide paging quickly becomes enormous in most large metropolitan areas.

For communications that are directed towards a mobile station, the cellular system uses the registration information to reduce the amount of paging needed to locate, activate, or establish a communication link with a mobile station. Registration information is also used to determine the set of base stations from which to broadcast a page signal.

Well known methods of registration in the art include registration at power up, and registration upon entering each new base station coverage area, among many others. Several communication systems, such as those of the Advanced Mobile Phone Service (AMPS) and Global System for Mobile Communications (GSM) variety, use a periodic or counter method to determine the location of the mobile station. Although these methods are far from ideal, they nevertheless can significantly reduce the amount of required paging in a communication system. Registration procedures are similar among the various modulation schemes, including AMPS, TDMA, and CDMA. CDMA registration techniques are described in detail in Telecommunication Industry Association IS-95 and IS-95A, herein referred to as simply IS-95.

A mobile station may operate in one of several different states. For example, IS-95 describes an initialization state, an idle state, a system access state, and a traffic channel state. A mobile station operating in the idle state is generally required to register at regular intervals in order to notify the base station of its whereabouts. However, not all registrations are needed from all mobile stations. Specifically, registrations are not needed from mobile stations who are not currently subscribed to a communication system. These mobile stations are not authorized to operate in the system, yet, under current registration protocols, they are required to register in the same manner as mobile stations who are subscribed. With the ever increasing number of mobile stations being manufactured and placed on the market today, the number of mobile stations present in the system, but who are not actively subscribed, is becoming more and more prevalent. Thus, the number of needless registrations from such inactive mobile stations is beginning to generate an unacceptable amount of unnecessary registration traffic, negatively impacting system resources and network bandwidth.

Currently, mobile stations cannot detect whether their subscription is active or not. The registration process as defined today in cellular standards does not provide the capability of allowing a communication system operator to selectively disable the registration for inactive or non-subscribed mobile stations.

One solution to this problem is to simply disable the mobile station completely, until its subscription to the communication system is activated. There are several drawbacks to this approach. Chief among them is that the mobile station is not able to take advantage of Over-The-Air (OTA) programming, which is becoming a popular method to program mobile stations. In addition, other communications would not be possible if the mobile station was completely disabled. For example, an emergency call could not be completed. Service providers would ideally like a mobile station operator to be able to make this kind of call, even if the mobile station's subscription to the system is inactive. Furthermore, future regulations and standards will likely require this feature.

What is needed is a method and apparatus for selectively turning off the registration process for mobile stations which have either not yet been activated for service, or who have had service discontinued from them, while still allowing other communications to take place.

SUMMARY OF THE INVENTION

The present invention is a method and apparatus for disabling the registration process for mobile stations who are not actively subscribed to a communication system. This significantly reduces message traffic over the air-interface, as well as message traffic between communication systems, which in turn allows for higher capacity and decreased interference between mobile stations in the communication system.

The present invention provides each mobile station in the communication system with knowledge of its subscription status. The mobile station's subscription status is stored in a memory device within the mobile station. If a mobile station's subscription status is "inactive," the air-interface registration procedures normally carried out by the mobile station are deactivated. All other communications between the mobile station, one or more base stations, and a system controller remain enabled.

A new mobile station which has never been activated will be initialized from the factory with the subscription status set to "inactive," thereby preventing needless registrations. Upon service activation, either through manual service programming of the memory device, or via Over-The Air (OTA) service programming, the mobile station subscription status is switched to "active" for normal operation. If, at a later time, it is desired to terminate service to a particular mobile station, the subscription status is changed to "inactive" by the communication system management via the MSC and transmitted to the mobile station to be de-activated. The deactivation command changes the mobile station subscription status to "inactive," preventing any further registrations until the subscription status is changed back to "active."

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In most wireless communication systems, such as cellular, PCS, or satellite communication systems, some scheme is necessary to track the location and status of the mobile stations within the system. Without this knowledge, directing information toward a particular mobile station requires that a page, intended solely for the particular mobile station, be broadcast throughout the entire system coverage area in some predetermined, universal format to ensure that a particular mobile station is contacted. Using registration, the mobile station notifies a system controller or mobile switching center (MSC) of its status and location. The MSC records location information in a database, typically called a Visitor Location Register (VLR), and refers to the VLR upon receipt of a message intended for the particular mobile station to decide which base station(s) should be used to relay the message to the particular mobile station.

Figure 1:
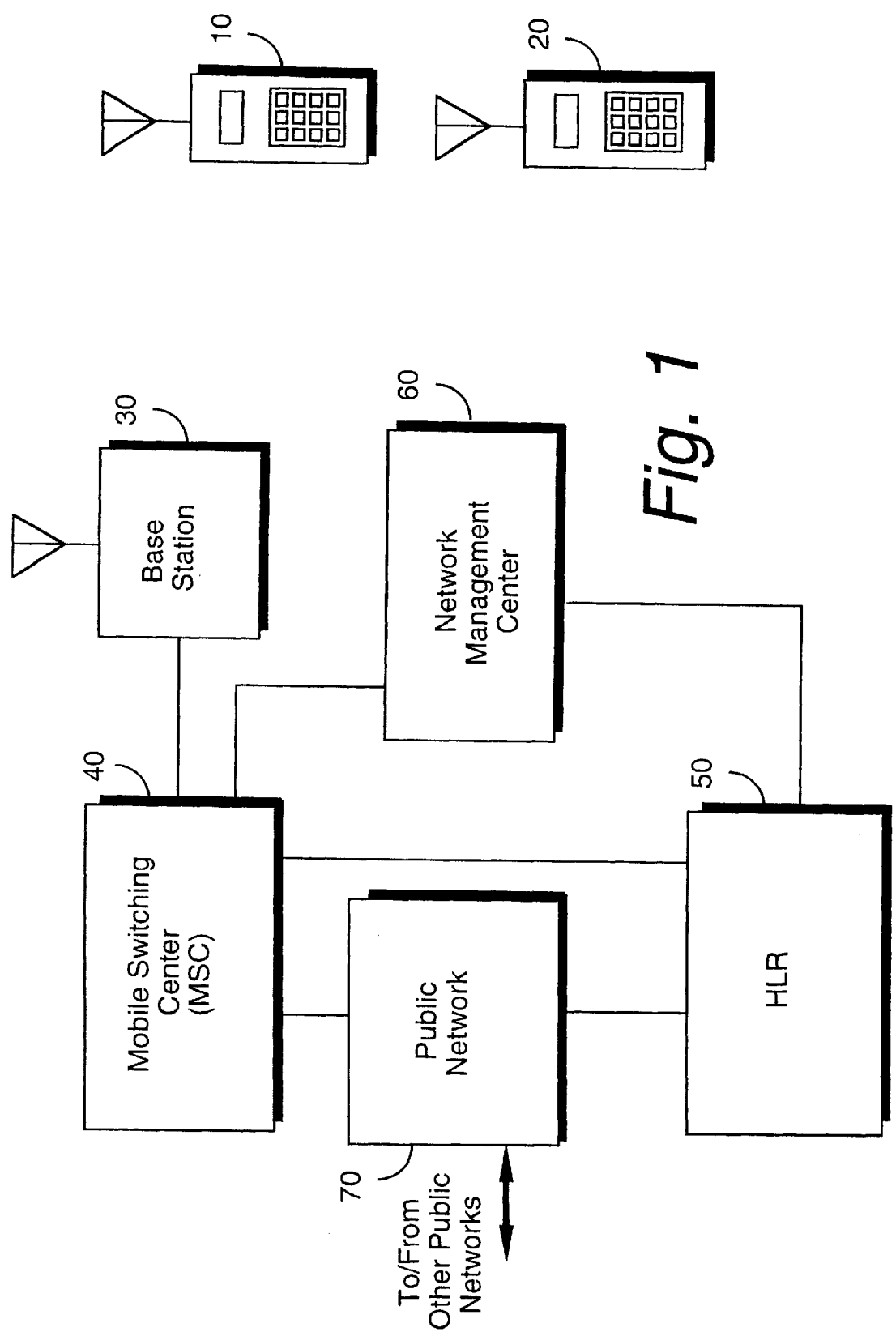
FIG. 1 illustrates a typical wireless communication system.

Referring to FIG. 1, when mobile station 10 registers with mobile switching center (MSC) 40 via base station 30, one or more identification parameters are transmitted in order for MSC 40 to track mobile station 10 as it travels throughout the communication system. MSC 40 represents any communications center where information is stored regarding the status of mobile stations in the communication system and is not limited to the embodiment shown in the communication system of FIG. 1. Such a communication center may additionally perform other functions as well, such as billing or interfacing to the Public Switch Telephone Network (PSTN). The transmitted identification parameters may include a mobile station serial number, a unique telephone number or some other unique identifier, a mobile station slot cycle index, a mobile station classification number, or a combination of these or other parameters. The registration information is received at a transceiver (not shown) located at base station 30 for the coverage area in which mobile station 10 is located. The registration information is relayed to MSC 40 by base station 30. Although not shown in FIG. 1, many base stations are employed in a typical communication system, and each base station is in communication with MSC 40 typically through a wire interface, such as a T1 or fiber optic cable.

The information transmitted during registration is stored along with registration information from other mobile stations in a database usually located within MSC 40, known as a Visitor Location Register (VLR). For example, mobile station 20 is another mobile station which is in a different location than mobile station 10 for which information is also stored in the VLR. Upon a registration event, such as power on or entrance into the service area of base station 30, mobile station 10 and mobile station 20 each transmit a registration message to base station 30 indicating their active presence within the coverage area of base station 30. The registration information is stored in the VLR, where it is used by MSC 40 to locate the mobile stations within the communication system when it is desired to communicate with a particular mobile station.

When a mobile station leaves the coverage area of a particular base station, its registration information is altered in the VLR. For example, if a mobile station moves out of the coverage area of base station 30 and moves into the coverage area of another base station, the mobile's registration information will be changed to reflect that the mobile is no longer in communication with base station 30. If a mobile station moves outside the coverage area of the entire communication system, its registration information is removed completely from the VLR associated with that system.

The coverage area of each base station in the communication system is generally represented by a hexagonal shape. However, it should be understood that in the actual cellular communication environment, base station coverage areas may vary in size and in shape. It should further be understood that the base station coverage areas may tend to overlap with coverage area boundaries defining a coverage area shape different than the ideal hexagonal shape. Furthermore, base stations may also be sectored such as into three sectors, as is well known in the art. The cellular system of FIG. 1 may be an analog or digital communication system and employ one or more of several types of multiple access modulation schemes such as Code Division Multiple Access (CDMA), Time Division Multiple Access (TDMA) or Frequency Division Modulation (FDM).

Mobile stations must be actively subscribed with a service provider before they can send and receive calls in a communication system. For example, when a mobile station, such as a wireless telephone, is initially purchased from a retail establishment, it must be activated, or its subscription activated, with a service provider before it can place and receive calls. This is usually a two-step process. First, the mobile station must be programmed with certain parameters, such as a Mobile Identification Number (MIN), telephone number, classification, etc., which are provided by network management center 60. This information is also provided to a Home Location Register (HLR) 50. HLR 50 is a database containing information about every mobile station that is subscribed to the communication system managed by one or more network management centers 60. The mobile station is provided with this information by either manual or Over-The-Air programming.

MSC 40 communicates directly with HLR 50 for a number of reasons. One of those reasons is to determine if a mobile station in the communication system is authorized to place or receive communications, i.e., whether or not the mobile station's subscription status is active or inactive. If the mobile station's subscription status is inactive, a call to or from the particular mobile station generally will not be permitted.

Public network 70 communicates with MSC 40 and HLR 50. Public network 70 represents a Public Switch Telephone Network (PSTN) or a SS7 public network and is connected to public networks in other communication systems. As a mobile station travels from one communication system to another, its location is transmitted, via registration procedures, to base stations located in these communication systems. The location of the mobile station is then sent to the mobile station's "home" communication system, i.e., where the mobile station is actively subscribed for service. The mobile station's location is then stored in its "home" HLR 50. A call to the mobile station located in another communication system can then be routed to the other communication system per the information stored in HLR 50.

To discontinue service to the mobile station, a message originates at network management center 60 requesting that a particular mobile station's subscription status be changed to "inactive." The message is sent to HLR 50 where the mobile station subscription status is changed to reflect that it is no longer an active subscriber within the system. However, in present communication systems, no message is relayed to the mobile station informing it of the status change. Consequently, all functions in the mobile station remain activated. For example, the mobile station continues to monitor nearby pilot signals, perform idle handoffs, and acknowledge messages sent by MSC 40. The details of these and other functions performed by mobile station 10 can be found in U.S. Pat. No. 5,577,022 entitled, "PILOT SIGNAL SEARCHING TECHNIQUE FOR A CELLULAR COMMUNICATIONS SYSTEM," which is incorporated by reference herein. The mobile station also continues to perform registration procedures in accordance with the protocols established by international standards, i.e., AMPS, GSM, CDMA, etc. These registrations are unnecessary, since the mobile station is not authorized to place or receive calls in the communication system.

These unnecessary registrations negatively impact communication systems in two ways: they impact the air interface and waste network resources. In CDMA systems, transmissions from mobile stations create interference to other mobile stations, resulting in the need to transmit at greater power, thus decreasing system capacity. The other negative impact to the air interface results in fewer circuits, i.e. modulators, demodulators, and modems, in a given base station through which other mobile stations may communicate. Network resources are negatively impacted by unnecessary message traffic because of the increased cost of transmitting needless information between different communication systems. For example, as a mobile station roams from one communication system to another, it registers with each communication system's MSC. As it does so, a message must be transmitted to the mobile station's "home" communication system, alerting it to the mobile station's whereabouts. This message traffic is relatively expensive and is needless in the case of a non-subscribed mobile station.

Figure 2:
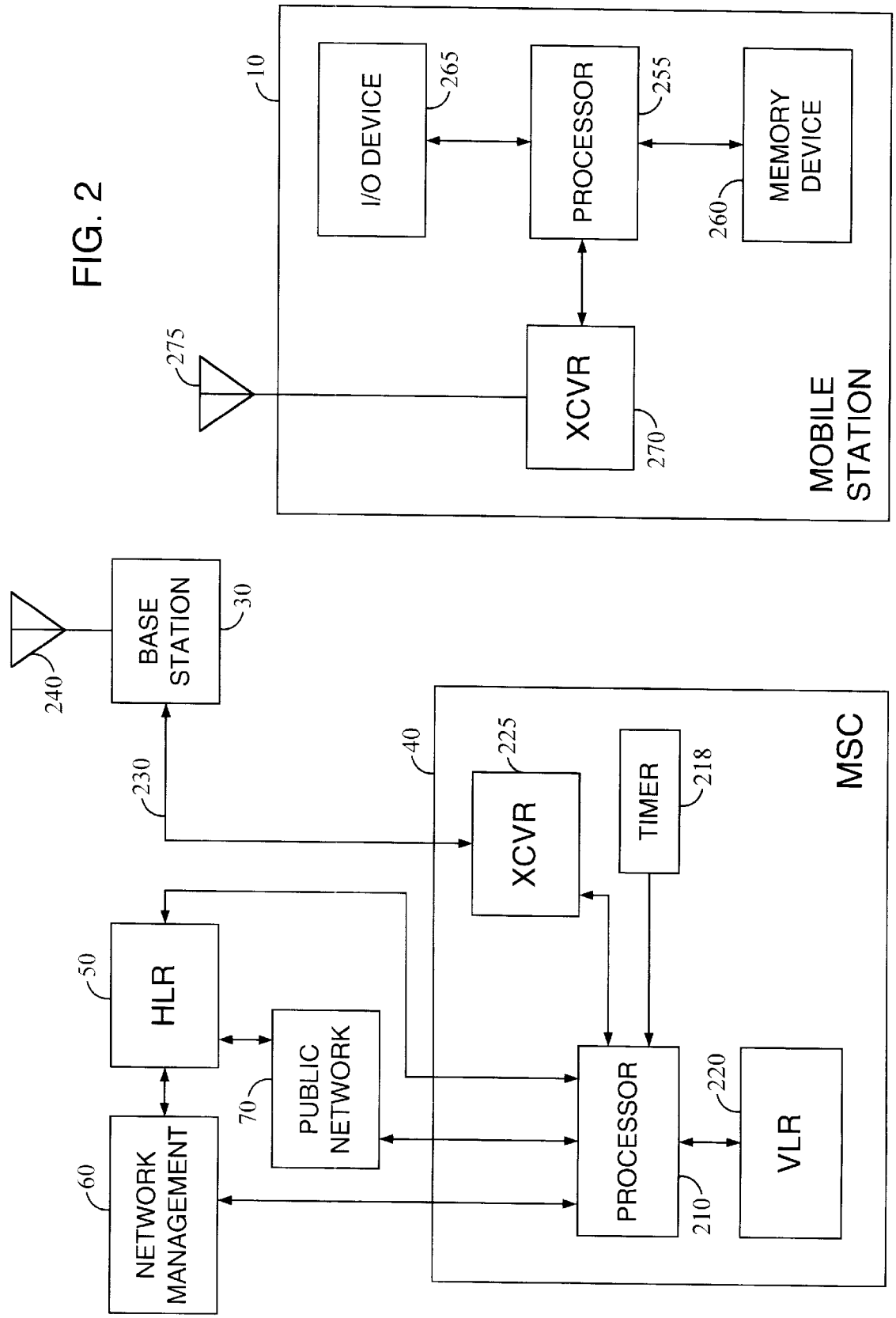
FIG. 2 illustrates a detailed view of the various components of the communication system, including the components of the present invention.

FIG. 2 is a more detailed illustration of MSC 40, base station 30, and mobile station 10, showing the components necessary to carry out the present invention in a communication system 200. Communication system 200 is represented by a mobile switching center (MSC) 40, a processor 210, an HLR 50, a network management center 60, a public network 70, a timer 218, a VLR 220, a transceiver 225, a communication link 230, a base station 30, an antenna 240, a mobile station 10, a processor 255, a memory device 260, an I/O device 265, a transceiver 270, and an antenna 275. It should be understood that although only one base station 230 is shown in FIG. 2, communication system 200 typically employs multiple base stations, each in communication with MSC 40.

For purposes of discussion, it is assumed that mobile station 10 is an active subscriber in communication system 200, having been programmed with the necessary information to communicate with MSC 40. For example, a Mobile Identification Number and telephone number have already been assigned to mobile station 10 and stored in both memory device 260 and HLR 50. The information may have been manually programmed or received through the air-interface via Over-The-Air programming. It is also assumed that mobile station 10 has registered with base station 30, having its registration information stored in VLR 220. It should be understood that although HLR 50 is shown in FIG. 2 as a separate entity from MSC 40, in another embodiment, HLR 50 could be located at or within MSC 40.

In the exemplary embodiment of the present invention, mobile station 10 contains memory device 260 which stores, among other things, a mobile station subscription status. The mobile station subscription status is in either one of two states: "active" or "inactive". If the mobile station subscription status is in the "active" state, mobile station 10 is allowed to carry on all functions relating to communication with MSC 40. For example, a mobile station user may place or receive a telephone call, and mobile station 10 can perform all background tasks necessary to support such calls, such as registration, idle hand-off, pilot searching, and power control. In short, mobile station 10 is fully functional when the mobile station subscription status is in the "subscribed" state. In the exemplary embodiment, memory device 260 is non-volatile, which means that when power is removed from mobile station 10, the data stored therein is not lost and is retrievable upon subsequent power on.

In accordance with the teachings of the present invention, if the mobile station subscription status is in the "inactive" state, only the registration process is inhibited. All other functions carried out by mobile station 10 will proceed in a normal manner. For example, mobile station 10 will still search for pilot signals, respond to paging signals, and perform idle handoffs. Mobile station 10 can even transmit an origination message, which is an attempt to place a call. The call will not be connected, however, because the mobile station subscription status is also stored at HLR 50. If MSC 40 determines that the mobile's subscription status is in the "inactive" state, the call will not be connected to its intended recipient.

A mobile station subscription may be changed from "active" to "inactive" and vice-versa for a number of reasons. For example, in the exemplary embodiment, when a mobile station is initially manufactured, the subscription status is set to the "inactive" state. To activate phone service, the subscription status must be changed both in the mobile station and in HLR 50. If phone service is to be terminated, for instance if service is no longer desired by the mobile station user or if the user is delinquent in paying necessary fees for communication services, the subscription status must be changed to the "inactive" state in either mobile station 10 or HLR 50.

In present communication systems, the mobile station subscription status is changed only at HLR 50, allowing mobile station 10 to continue all communication functions such as paging, messaging, and registration. The present invention provides the mobile station subscription status to mobile station 10 when it is changed at HLR 50. When the subscription status is changed to "inactive", only the registration procedure is disabled, eliminating unnecessary registrations. All other paging and messaging functions remain enabled.

The mobile station subscription status may be changed manually or via Over-The-Air programming. If manual programming is used, a mobile station user typically must take the mobile station to a service center, such as network management center 60 for manual programming. I/O device 265 provides an interface from which to alter the mobile station subscription status. I/O device 265 is typically a keypad combined with a display which allows an authorized person to change the subscription status by entering the change via the keypad. An access code may be necessary to alter the subscription status so that it can not be changed indiscriminately by a user. The subscription status is provided to processor 255, which accesses memory device 260 and alters the mobile station subscription status in accordance with the request from I/O device 265. Once the mobile station subscription status has been altered, it remains stored in memory device 260 until it is changed at a later time. Network management center 60 then notifies HLR 50 that the mobile station is now an active subscriber in communication system 200.

Figure 3:
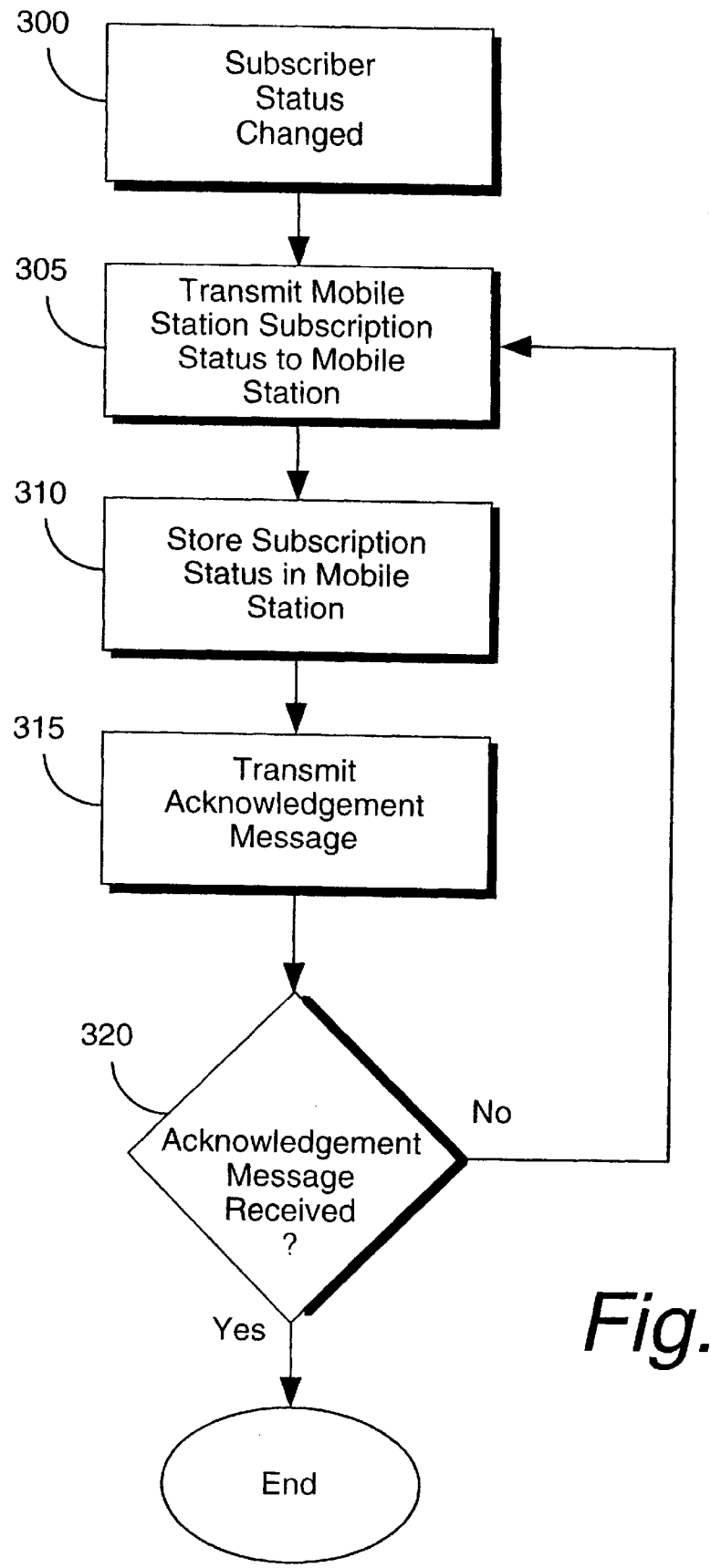
FIG. 3 is a flow diagram illustrating how a mobile station subscription status is changed via Over-The-Air programming.

Alternatively, the mobile station subscription status can be changed via Over-The-Air programming, as shown in FIG. 3. A request to change the subscription status may be originated by either the mobile station user or by network management center 60, and is shown in FIG. 3 as step 300. In either case, the subscription change request is forwarded from network management center 60 to processor 210 and HLR 50. The mobile station's subscription status is changed in HLR 50 to reflect the current subscription status, either active or inactive.

As shown in step 305 of FIG. 3, processor 210 transmits a mobile station subscription status to mobile station 10, informing mobile station 10 of the updated subscription status as stored in HLR 50. Using timer 218, processor 210 records the time that the subscription status was transmitted, used for acknowledgment purposes, as described later herein. Transceiver 225 modulates the mobile station subscription information in accordance with one of many communication protocols that are well known in the art in order to send data to base station 30. The modulated mobile station subscription information is sent to base station 30 via data link 230. Data link 230 is typically a T1 link, although any wire or wireless communication link could be used. Base station 30 is one of a number of base stations throughout communication system 200. The mobile station subscription status is sent to at least one base station 30 through which mobile station has registered recently. In a preferred embodiment, the mobile station subscription status is sent over a paging channel, which is a communication channel reserved for sending overhead messages to and from a mobile station in a communication system.

The mobile station subscription status information is modulated by base station 30 using one of many possible well known modulation schemes, such as TDMA, CDMA, or AMPS. The subscription status information may be sent as an individual message over one of any number of communication channels, such as a traffic channel or a paging channel. Alternatively, other well known techniques in the art may be used for transmitting the subscription status information, such as appending it to an existing message or otherwise combining it with other information to be transmitted to mobile station 10. The modulated subscription status is transmitted through antenna 240 to mobile station 10 via antenna 275. Transceiver 270 de-modulates the mobile station subscription status so that it may be forwarded to processor 255. Upon receipt of the de-modulated mobile station subscription status, processor 255 accesses memory device 260 and changes the mobile station subscription status to match the received subscription status.

Thus, the updated mobile station subscription status is stored in mobile station 10, as shown in step 310 of FIG. 3.

If the mobile station subscription status was successfully changed in memory device 260, processor 255 sends an acknowledgment message to MSC 40 informing it that the subscription status has been changed. This step is shown as step 315 in FIG. 3. If the mobile station subscription status is not received by mobile station 10 for whatever reason, or if the mobile station subscription status is received but not changed in memory device 260, no acknowledgment message is sent.

At MSC 40, processor 210 waits for receipt of the acknowledgment message from mobile station 10. If the acknowledgment message is not received within a predetermined amount of time, as determined by processor 210 and timer 218, the subscription status is transmitted again. This step is shown as step 320 in FIG. 3. This process is repeated until either the acknowledgment message is received, or a predetermined number of failed attempts is recorded.

If the subscription status has been changed to the "inactive" state, mobile station 10 is prevented from transmitting any further registration messages. For example, in a typical CDMA communication system based on IS-95, there are nine types of registrations possible. The nine types of registration are power up, power down, timer based, distance based, zone based, parameter change, ordered, implicit, and traffic channel registration. When processor 255 determines that an event has transpired requiring registration, memory device 260 is accessed to first determine if the mobile station subscription status is in the "active" or "inactive" state. If the subscription status is "inactive," registration is disabled, thus eliminating needless transmissions, increasing the interference between mobile stations and waste precious system bandwidth and resources.

IS-95 presently does not have a variable reserved to represent the mobile station subscription status. As a result, in one embodiment, a new subscription status variable is defined. In the exemplary embodiment, the new variable is called MOBILE_SUBSCRIPTION_STATUS and is 1 bit in length. The MOBILE_SUBSCRIPTION_STATUS variable is set to '0' for an inactive subscription status and '1' for an active subscription. The MOBILE_SUBSCRIPTION_STATUS variable is transmitted from MSC 40 to mobile station 10 according to the transmission procedure described above. IS-95 does not contain a provision for such a variable, therefore a system change is necessary.

In an alternate embodiment, a new subscription status variable is not required. Therefore, in communication systems employing IS-95 CDMA, no significant changes to the system are necessary. In the alternative embodiment, the existing MOB_TERM_XXXp variables stored in memory device 260 and defined in IS-95, are used to disable the registration process. There are three MOB_TERM_XXXp variables defined by IS-95. They are MOB_TERM_HOMEp, MOB_TERM_FOR_SIDp, and MOB_TERM_FOR_NIDp. IS-5 also defines the variable REG_ENABLEDs which enables or disables autonomous registrations. Autonomous registrations are initiated by the mobile station in response to an event, without being explicitly directed to register by a base station or a mobile switching center. Examples of autonomous registrations are registration upon power up or power down of the mobile station, registration after a predetermined time has elapsed from a previous registration, and registrations based on the location of the mobile station. When autonomous registration is disabled, the mobile station registration process is effectively turned off. The REG_ENABLEDs status is determined in part by the MOB_TERM_XXXp variables. Setting all three MOB_TERM_XXXp variables to '0' sets REG_ENABLEDs to 'NO', disabling autonomous registration. It should be understood that other forms of registration are still possible, even though autonomous registrations have been disabled. For example, IS-95 defines several other forms of registration which are initiated by a base station or a mobile system controller. These type of registrations are defined by IS-95 as parameter change registration, ordered registration, traffic channel registration, and implicit registration. These types of registrations will still be enabled even though the autonomous registrations have been disabled. However, by eliminating autonomous registrations, most of the registration traffic will be eliminated.

The previous description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for reducing messaging traffic, including air and network messaging, in a wireless communication system, said system comprising a mobile switching center, at least one mobile station, and at least one base station, said method comprising the steps of:

providing at least one mobile station with a mobile station subscription status;

storing said mobile station subscription status in a memory device;

preventing said mobile station from registering with said communication system if said mobile station subscription status indicates that said mobile station is inactive.

2. The method of claim 1 further comprising the step of:

allowing said at least one mobile station to otherwise communicate with said mobile switching center, even when said mobile station subscription status indicates that said mobile station is inactive.

3. The method of claim 1 further comprising the steps of:

transmitting an acknowledgment message from said mobile station to said mobile switching center upon storing said mobile station subscription status in said memory device; and re-transmitting said mobile station subscription status by said mobile switching center if said acknowledgment message is not received by said mobile station switching center within a predetermined amount of time.

4. The method of claim 3 wherein the step of re-transmitting said mobile station subscription status is repeated for a predetermined number of times.

5. The method of claim 2 wherein the step of allowing said at least one mobile station to otherwise communicate with said mobile switching center includes the ability to make emergency calls.

6. The method of claim 2 wherein the step of allowing said at least one mobile station to otherwise communicate with said mobile switching center includes the ability to provide Over-The-Air programming to said at least one mobile station.

7. An apparatus for reducing messaging traffic, including air and network messaging, in a wireless communication system, said system comprising a mobile switching center, at least one mobile station, and at least one base station, said apparatus comprising:

a memory device for storing a mobile station subscription status;

a transceiver for communicating to at least one base station;

a first processor, connected to said memory device and said transceiver, for receiving said mobile station subscription status and for storing said mobile station subscription status in said memory device;

wherein said mobile station is prevented from registering with said communication system if said mobile station subscription status is inactive.

8. The apparatus of claim 7 wherein said first processor sends an acknowledgment message to said mobile switching center if said mobile station subscription status has been altered.

9. The apparatus of claim 8 further comprising a timer connected to a second processor, for providing the time that a mobile station subscription status was transmitted, wherein said second processor re-transmits said mobile station subscription status if said acknowledgment message is not received within a predetermined amount of time from when said mobile station subscription status was last transmitted.

10. The apparatus of claim 7 wherein said memory device is a nonvolatile memory.

11. The apparatus of claim 7 further comprising an I/O device for altering said mobile station subscription status in said memory device.

12. The apparatus of claim 11 wherein said I/O device comprises a keypad and display.

* * * * *